United States Patent [19]
Tansony

[11] 3,803,919
[45] Apr. 16, 1974

[54] PUMPING DEVICE AND A LIQUID TAKE-OFF UNIT INCLUDING SAID DEVICE

[75] Inventor: John Reginald Tansony, Etobicoke, Ontario, Canada

[73] Assignee: Markland Speciality Engineering Ltd., Mississauga, Ontario, Canada

[22] Filed: Nov. 30, 1972

[21] Appl. No.: 310,712

[30] Foreign Application Priority Data
Dec. 22, 1971  Canada.............................. 7146094

[52] U.S. Cl. .............................. 73/421 B, 417/118
[51] Int. Cl. ............................................ G01n 1/14
[58] Field of Search ................... 73/421 B; 141/130; 417/118

[56] References Cited
UNITED STATES PATENTS
3,465,595   9/1969   Tansony ........................... 73/421 B
FOREIGN PATENTS OR APPLICATIONS
1,011,442   12/1965   Great Britain .................... 141/130

Primary Examiner—S. Clement Swisher
Attorney, Agent, or Firm—Wenderoth, Lind & Ponack

[57] ABSTRACT

Liquid pumping device comprising a closed vessel having a liquid inlet orifice communicating with the interior of the vessel by way of a check valve having an outlet. An outlet orifice of the vessel is adapted to communicate with a receiving means. A control orifice provided in the vessel is adapted to be put alternately in communication with the pressure of a gas and with atmospheric pressure. The control orifice communicates with the interior of the vessel below the level of the liquid which is established therein in the course of the filling of the vessel by equilibrium between the hydrostatic pressure and the pressure of a gas pocket trapped in the vessel above the level of the liquid. The volume of the gas pocket is such that the outlet of the check valve is above said level of the liquid.

10 Claims, 4 Drawing Figures

PATENTED APR 16 1974　　　　　　　　　3,803,919
FIG. 1
FIG. 1A
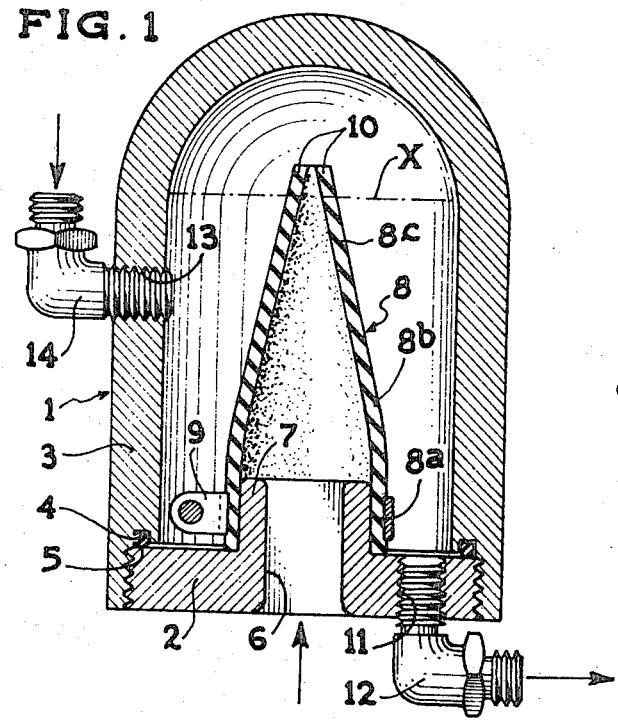
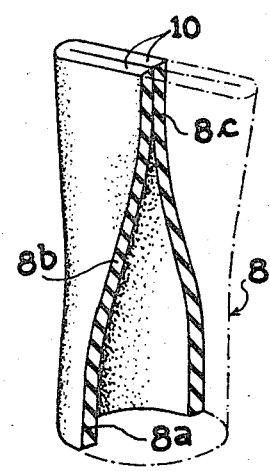
FIG. 2
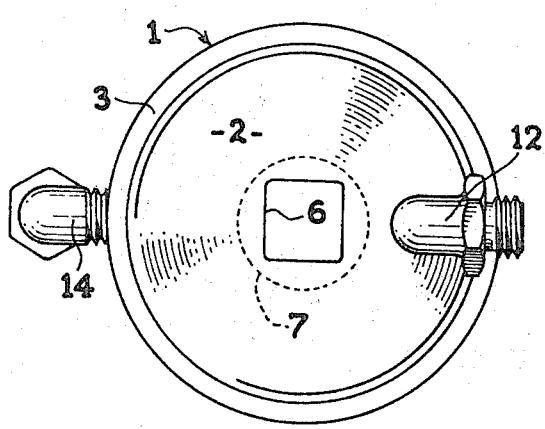

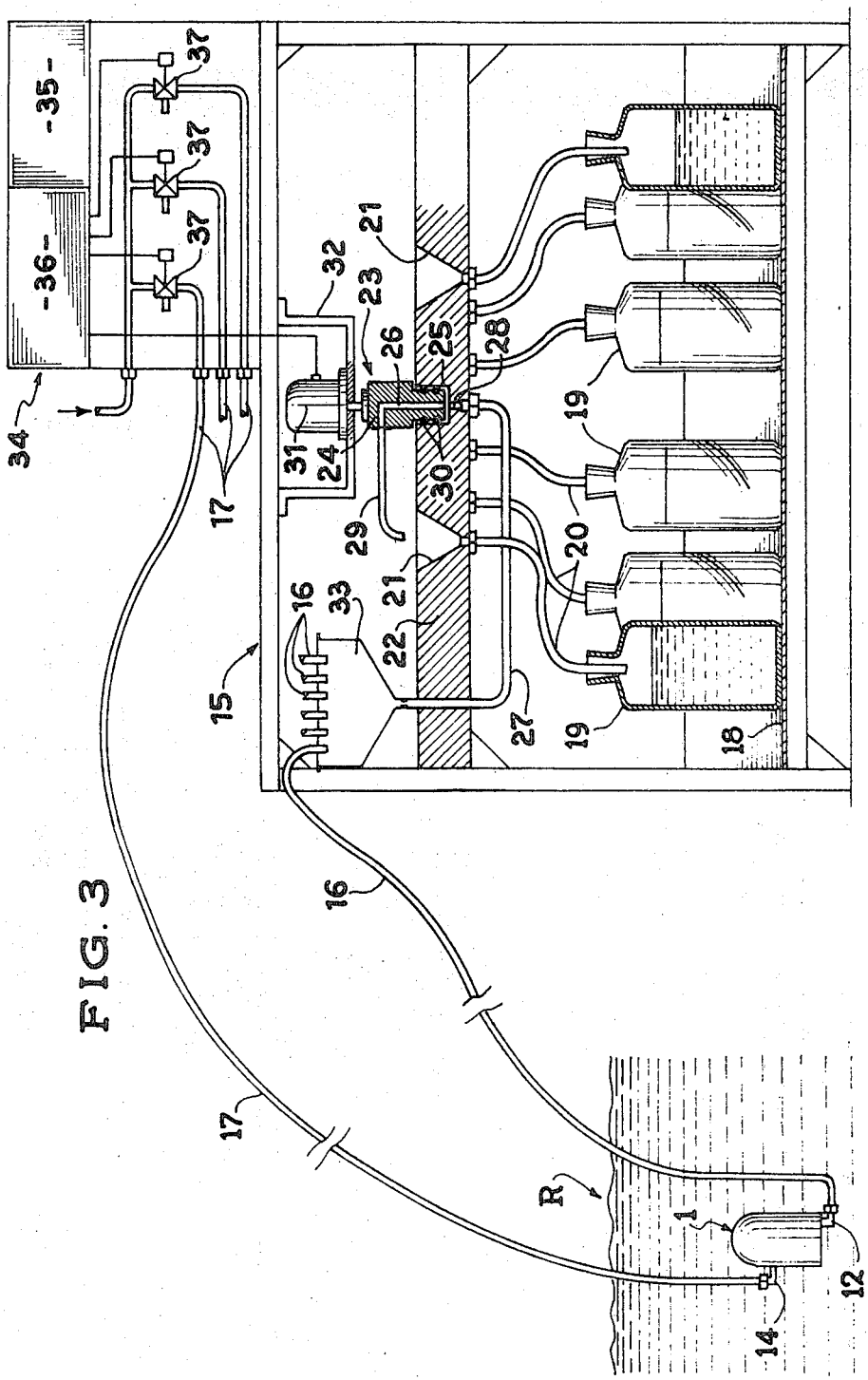

PUMPING DEVICE AND A LIQUID TAKE-OFF UNIT INCLUDING SAID DEVICE

The present invention relates to pumping devices, for example, employed in the taking off or sampling of liquids and especially those having solid materials in suspension, such as sea, river or canal water or drain water for the purpose of, for example, determining the degree of pollution.

Pumping devices are known which are employed for this purpose. One of them in particular comprises an immersible vessel defining a given volume which communicates with the exterior by way of only three orifices:

a first or inlet orifice through which the liquid enters the vessel under the effect of hydrostatic pressure, said orifice being associated with a non-return or check valve element of particular form;

a second or outlet orifice through which the liquid is discharged from the device, and a third or control orifice through which a pneumatic pressure can be exerted in the vessel so as to expel the liquid, on one hand, and close the check valve element on the other.

The valve element is constituted by an elastically deformable sleeve which extends upwardly from the bottom of the vessel and has in the unstressed state of rest a roughly "duck bill" shape, since it comprises a roughly conical portion near the inlet orifice and a flattened portion at its opposite end which defines a longitudinal slot or slit which may be closed by a pressure exerted on the outer surface of the flattened portion.

When the pumping device is immersed in the liquid, the hydrostatic pressure introduces a certain amount of liquid into the vessel, depending on the depth of immersion. This amount of liquid may be selectively expelled from the vessel by application of a pressure via the control orifice. This pressure deforms the sleeve of the valve element in such manner that the slot is closed. Consequently, by suitably modifying the pressure of the gas supplied, it is possible to obtain repeated fillings of the vessel and transfers to a reservoir or the like to which the pumping device is connected through the outlet orifice.

In the course of utilisation of such a pumping device, it has been found that when relatively voluminous bodies are mixed with the liquid, some of these bodies may remain jammed between the lips defining the slot of the valve element sleeve and in this case the pressure becomes insufficient to achieve the required liquidtight closure or seal. Consequently, when the liquid is expelled from the vessel by the effect of its pressure, a certain amount escapes through the check valve element and the overall efficiency of the pumping device is reduced.

An object of the present invention is to overcome this drawback of pumping devices of the above-defined known type.

The invention provides a liquid pumping device belonging to the general type defined hereinbefore and comprising a closed vessel in which are provided a liquid inlet orifice communicating with the interior of the vessel through a check valve element, a liquid outlet orifice adapted to communicate with a receiving means and a control orifice which is adapted to be put alternately in communication with the pressure of a gas and with atmospheric pressure, wherein said control orifice communicates with said vessel below the level of the liquid which is established therein in the course of the filling of the vessel by equilibrium between the hydrostatic pressure and the pressure of a gas pocket trapped in the vessel above the level of the liquid, the volume of said gas pocket being calculated in such manner that the outlet of said valve element is above said level.

Thus, as the level of the liquid does not reach the outlet of the check valve element, a leakage and return of the liquid, through this element cannot occur in the course of the application of the control pressure, even if the valve element imperfectly performs its closing or sealing function owing to the presence of particles in its outlet slot.

Another object of the invention is to provide, by way of an application of the pumping device defined hereinbefore, a probe for taking off samples of a liquid.

Another object of the invention is to provide a unit for taking off a liquid employing one or more of said sample-taking probes.

Further features and advantages of the invention will be apparent from the ensuing description with reference to the accompanying drawings.

In the drawings:

FIG. 1 is a sectional view of a pumping device according to the invention employed as a sample-taking probe;

FIG. 1A is a sectional perspective view of a check or non-return valve element employed in the device shown in FIG. 1;

FIG. 2 is a top view of the device, and

FIG. 3 is a unit for taking off liquid employing probes according to the invention.

FIGS. 1, 1A and 2 show a pumping device according to a preferred embodiment of the invention. This device comprises a vessel 1 comprising a detachable bottom wall 2 and a bell portion 3 which are of suitable material, such as metal or plastics material, which is resistant to the liquid to be pumped.

The mouth of the bell 3 is tapped and receives in an annular groove 4 a sealing ring 5 which seals the vessel in the region of the bottom wall 2.

The bottom wall 2 has a centre passage 6 which has a preferably square-shaped section so as to facilitate the assembly of the vessel by means of a conventional key with a square-sectioned end. It is also possible to provide two diametrically opposed cavities engageable by a key having lugs which are spaced the same distance apart.

The square-shaped passage 6 extends upwardly in the form of a spigot 7 which is in one piece with the bottom wall 2 and has a cylindrical outer shape. The spigot 7 receives a check or non-return valve element 8 comprising a sleeve of synthetic or natural elastomer material. The valve element has the general shape shown in FIG. 1 which is known as a "duck bill" shape. It comprises at its base a fixing portion 8a which is adapted to be fitted on the annular spigot 7 and is secured to the latter by a clamping collar 9.

The fixing portion 8a is extended by a roughly conical portion 8b and the latter is extended by a flattened portion 8c which defines at its free end two lip portions 10.

The bottom wall 2 has furthermore a tapped aperture 11 which receives a screwthreaded connection 12 for discharging the contents of the vessel 1.

In the lateral wall portion of the bell 3 there is provided a tapped aperture 13 which receives a screwthreaded connection 14 for putting the interior of the vessel 1 under pressure. This connection is therefore connected to a source of gas under pressure, for example air, which is not shown in FIG. 1, 1A or 2.

As will be understood hereinafter, the height of the aperture 13 in the wall of the vessel 1 relative to the outlet of the valve element 8 constituted by the lip portions 10 is determined in such manner as to ensure the correct operation of the pumping device.

The pumping device operates in the following manner:

When the pumping device is immersed in the liquid to be pumped, the connection 12 being connected to a receiving tank and the connection 14 being connected selectively through a valve device, such as a three-way valve, either to a source of gas under pressure or to the atmosphere, the vessel 1 is filled when the connection 14 is connected to the atmosphere.

Indeed, the lip portions 10 of the valve element 8 are then spread apart and allow passage of the liquid. The level of the latter in the vessel then gradually rises and travels beyond the aperture 13 and continues to rise until the pressure of the volume of gas trapped in the vessel above the liquid balances the hydrostatic pressure. Now, according to the invention, the height of the aperture 13 is so chosen that at the moment when pressure equilibrium is reached, the level of the liquid is still below the lip portions 10, roughly as shown in FIG. 1 by the dot-dash line X.

Under these conditions, and bearing in mind that the lip portions 10 are not immersed in the liquid, these lip portions do not need to be absolutely tightly and sealingly applied against each other.

When the liquid has filled the vessel 1, the pressure of the gas is applied by putting the control valve in communication with the pressure of the gas and this drives out the volume of liquid through the outlet connection 12 to the receiving tank. As this occurs, the pressure of gas deforms the valve element 8 in such manner as to bring the lip portions 10 together as shown in FIG. 1A.

Meanwhile, even if some particle has somewhat prevented the complete closure of the valve element, no leakage of liquid can occur through the latter owing to the fact that the liquid has not reached the level of the lip portions 10. On the contrary, owing to its deformation, the valve element tends to expel downwardly the particles which might have been previously introduced therein.

It will be observed that, according to another feature of the invention, the outlet connection 12 communicates with the bottom wall 2 of the vessel so that even if the materials in suspension in the liquid were deposited to a certain extent on the bottom of the vessel 1 before application of the control pressure, they are nonetheless discharged with the whole of the contents of the vessel, which would not be the case if this connection were for example positioned in the lateral wall of the vessel.

FIG. 3 shows a unit in which the pumping device just described is employed as a sample-taking probe. This unit thus permits taking off liquid, such as water of the river R as shown or some other liquid, in a discontinuous manner.

There is provided for each probe a flexible pipe 16 for conveying the samples taken off to the cabinet 15 and a flexible pipe 16 for applying the control pressure.

The cabinet 16 comprises a floor 18 on which are placed a number of receiving bottles 19 which are connected respectively through pipes 20 to funnels 21. The latter are formed in an intermediate wall 22.

The bottles 19 are of course removable and may be periodically replaced for submission of the samples received to analysis in a laboratory, for example.

The funnels 21 are arranged on a circle at the centre of which is disposed a distributing device 23 which distributes the samples among the bottles 19 in accordance with a predetermined program.

This distributing device 23 comprises a rotary element 24 disposed in a cylindrical cavity 25 formed in the partition wall 22, its axis coinciding with the centre of the circle on which the funnels 21 are arranged. The cavity 25 thus serves as a pivot for the rotary element 24. Extending through the latter is a passage 26 which communicates, at one end, with a pipe 27 through an aperture 28 formed in the wall 22 and, at the other end, with a pouring spout 29 fixed on the rotary element 24.

The length of the pouring spout 29 is equal to the radius of the circle on which the funnels 21 are arranged. Sealing rings 30 are provided to afford a suitable seal.

The element 24 is rotated by means of a step-by-step motor 31 which is fixed to a bracket 32 secured to the cabinet 15. The pipe 27 is connected to a check or non-return valve device 33 constituted by a vessel with the interior of which communicate the flexible pipes 16 connected to the respective probes 1.

The probes 1 are connected to an automatic control box 34 which comprises an electric supply circuit 35 and is also connected to a source of gas under pressure such as a cylinder of compressed air (not shown). The operations are controlled by a programming device 36 which is supplied by the circuit 35 and connected, through three-way valves 37, to the pipes 27 of the probes 1.

Further, the step-by-step motor 31 is also driven by a programming means 36.

This unit can be made to operate in accordance with numerous predetermined programs which are determined by the regulation of the programming means 36.

By way of example, and assuming the use of a single probe 1, the samples taken off are distributed in 24 containers 19. The timing circuit 36 can then for example be adapted in such manner as to ensure periodically the application of gas under pressure to the probe 1 for example 12 times per hour and during 10 seconds, the samples thus taken off all being pou-red into one of the bottles 19.

As the programming means 36 is regulated in such manner as to ensure the operation of the motor 31 in each hour, there is thus produced at the start of the following hour a shifting of the pouring spout 29 to a position above the neighbouring funnel 21 connected to another bottle 19 which receives the samples during this following hour and so on.

Note that the construction and design of the control box 34 poses no problem to the specialist in the art and

Having now described my invention what I claim as new and desire to secure by Letters Patent is:

1. A liquid pumping device comprising a closed vessel defining a chamber and provided with a liquid inlet orifice, a liquid outlet orifice adapted to communicate with a receiving means, a control orifice for putting said chamber alternately in communication with the pressure of a gas and with atmospheric pressure, and check valve means having an outlet interposed between said inlet orifice and said chamber whereby said inlet orifice communicates with said chamber by way of said outlet of said check valve means, said control orifice being positioned in the vessel to communicate with said chamber below the level of the liquid which is established therein in the course of the filling of the chamber by equilibrium between the hydrostatic pressure and the pressure of a gas pocket trapped in the chamber above the level of the liquid, the volume of said gas pocket being such that the outlet of said check valve means is above said level.

2. A device as claimed in claim 1, wherein said check valve means comprises an elastically deformable sleeve which extends in said chamber and has a first substantially cylindrical portion directly connected to said inlet orifice, a second tapering position which extends the cylindrical portion and a third flattened portion which extends the tapering portion and has two end lip portions defining a slot therebetween which is ordinarily closed in an unstressed state of rest of the deformable sleeve and is opened under the effect of the hydrostatic pressure and closed under the effect of a control pressure exerted by way of the control orifice.

3. A device as claimed in claim 1, wherein said vessel comprises a bell-shaped member having an annular mouth portion, and a bottom wall secured in the mouth portion, the check valve means being fixed in said bottom wall.

4. A device as claimed in claim 3, wherein said inlet orifice comprises a passage provided in said bottom wall and an annular spigot portion which extends the passage inwardly into the chamber and is fixed to said check valve means.

5. A device as claimed in claim 3, wherein said outlet orifice is formed in said bottom wall.

6. A probe for taking samples of a liquid comprising a pumping device which comprises a closed vessel defining a chamber and provided with a liquid inlet orifice, a liquid outlet orifice adapted to communicate with a receiving means, a control orifice for putting said chamber alternately in communication with the pressure of a gas and with atmospheric pressure, and check valve means having an outlet interposed between said inlet orifice and said chamber whereby said inlet orifice communicates with said chamber by way of said outlet of said check valve means, said control orifice being positioned in the vessel to communicate with said chamber below the level of the liquid which is established therein in the course of the filling of the chamber by equilibrium between the hydrostatic pressure and the pressure of a gas pocket trapped in the chamber above the level of the liquid, the volume of said gas pocket being such that the outlet of said check valve means is above said level.

7. A unit for taking off liquid comprising at least one remote probe comprising a pumping device which comprises a closed vessel defining a chamber and provided with a liquid inlet orifice, a liquid outlet orifice adapted to communicate with a receiving means, a control orifice for putting said chamber alternately in communication with the pressure of a gas and with atmospheric pressure, and check valve means having an outlet interposed between said inlet orifice and said chamber whereby said inlet orifice communicates with said chamber by way of said outlet of said check valve means, said control orifice being positioned in the vessel to communicate with said chamber below the level of the liquid which is established therein in the course of the filling of the chamber by equilibrium between the hydrostatic pressure and the pressure of a gas pocket trapped in the chamber above the level of the liquid, the volume of said gas pocket being such that the outlet of said check valve means is above said level, the unit further comprising means for receiving liquid samples, a distributing valve device, said receiving means being in communication with said probe through the distributing valve device, a source of gaseous pressure and a control device for controlling selectively the connection of the probe to said source of gaseous pressure or to the atmosphere and driving said distributing valve device.

8. A unit as claimed in claim 7, wherein said receiving means comprise bottles which are put selectively in communication with the probe through said distributing valve device.

9. A unit as claimed in claim 7, wherein said distributing valve device comprises a plurality of funnels which respectively communicate with said receiving means, a rotary element, a pouring spout fixed to the rotary element so as to be capable of being brought selectively over the funnels, the pouring spout communicating with the probe, and a step-by-step motor for rotating the pouring spout and controlled by said control device.

10. A unit as claimed in claim 7, comprising programming means, valve means controlled by the programming means and connecting the control device to a source of gas under pressure which is selectively connected to the control orifices of said probe.

* * * * *